July 17, 1923.
P. E. VAN NOSTRAND
AUTO APPLIANCE
Filed Oct. 24, 1921
1,462,398
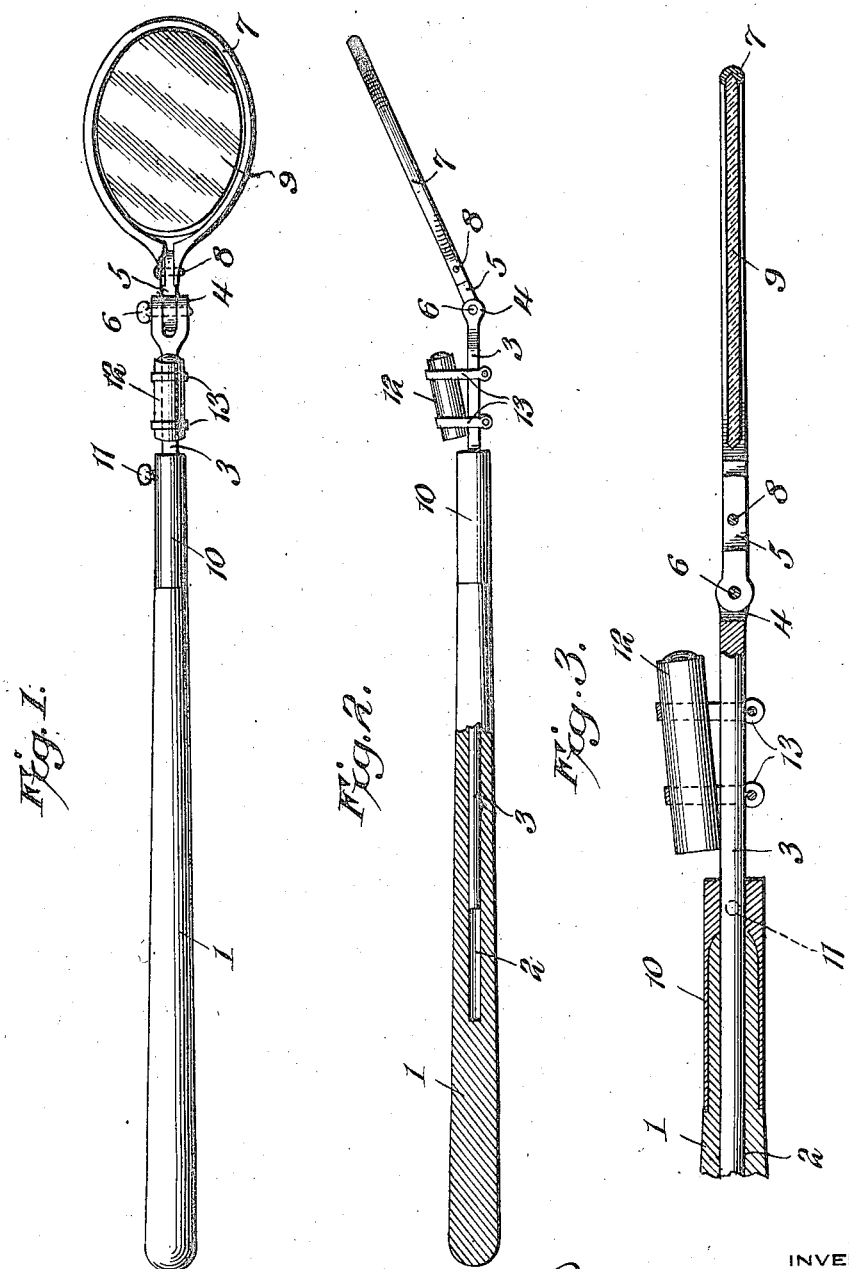

Patented July 17, 1923.

1,462,398

UNITED STATES PATENT OFFICE.

PAUL E. VAN NOSTRAND, OF LYONS, NEBRASKA.

AUTO APPLIANCE.

Application filed October 24, 1921. Serial No. 509,813.

*To all whom it may concern:*

Be it known that I, PAUL E. VAN NOSTRAND, a citizen of the United States, residing at Lyons, in the county of Burt and State of Nebraska, have invented new and useful Improvements in Auto Appliances, of which the following is a specification.

My present invention pertains to automobile appliances and it contemplates the provision of a device through the medium of which an automobile driver or occupants thereof, may, without leaving the vehicle, either during a drive in the day or night, ascertain the condition of pneumatic tires attached to the said vehicle wheels.

The invention is also adapted to enable a motorist to ascertain readily what traffic is in his rear.

The invention in all of its details will be fully understood from the following description and claims when the same are read in connection with the drawings accompanying and forming part of this specification, in which:—

Figure 1 is a perspective view of my novel device.

Figure 2 is a side elevation of the device and showing the handle partly in section.

Figure 3 is a longitudinal sectional view and showing a portion of the device in side elevation.

Similar numerals of reference designate corresponding parts in all the views, of the drawings.

My novel device comprises a handle portion 1 that is interiorly bored from a point slightly beyond the center thereof, and adapted to enter the bore 2 is a rod or member 3. This rod 3 is provided with straps 13 by which a pocket flash light 12 of any construction may be conveniently held on the rod at its outer end.

Pivoted to the forked end 4 of the rod 3 by means of the thumb-screw 6 is the member 5 that enters the forked end of the rod 3 and is held in proper position by the nut 6.

At is outer end the member 5 receives the ends of a band 7 and said ends of the band are secured to the member 5 by a pin 8.

The band 7 receives a mirror 9.

At the inner end of the rod, I provide a ferrule 10 through which a thumb-screw 11 passes to prevent casual displacement of the rod 3 from the handle 1.

It will be gathered from the foregoing that the handle may be extended by manipulation of the screw 11 and that the mirror may be thrown at various angles by manipulation of the screw 6.

When it is desired to ascertain the condition of a tire i. e. to determine if the casing is flat or for determining the condition of any part of a motor vehicle outside the interior thereof, it is simply necessary to adjust the mirror to the proper angle as well as the handle to the proper length, when the device is ready for use.

At night time the flash light button may be switched on and the reflections of the light thrown on the mirror.

While my device is especially useful in connection with motor vehicles and the like, I wish it to be understood that it is also of value to the professional man, as for example, a dentist or again to a laborer when such characteristics as my device possesses will assist to a better examination and hence undersctanding of the object upon which it is used.

My device is simple, inexpensive and handy in construction and may readily be dis-assembled for storage and shipping purposes and is readily adaptable to any purpose that might suggest itself.

Having described my invention, what I claim and desire to secure by Letters-Patent is, In a device for the purpose set forth, the combination of an adjustable and extensionable handle, comprising two portions; one of which is provided with a longitudinal central bore that extends from one end to a point slightly beyond the longitudinal center thereof; and the other of said portions being adapted to enter the bore of the first portion, a ferrule surrounding one end of the second portion, and a comparatively short portion of the second portion extending slightly beyond the ferrule, brackets secured on the comparatively short portion, illuminating means secured in the brackets, a yoke formed integral on one end of the arm, and a mirror adjustably secured in the yoke and adapted to be positioned at various angles with respect to the handle portions, arm and illuminating means.

In testimony whereof I have hereunto set my hand in presence of two subscribing witnesses.

PAUL E. VAN NOSTRAND.

Witnesses:
ERNEST McDOWELL,
JOHN A. YOUNG.